United States Patent

Urahashi

[11] Patent Number: 5,899,953
[45] Date of Patent: May 4, 1999

[54] RUNNING CONTROL DEVICE MOUNTED IN A VEHICLE

[75] Inventor: Kazuyoshi Urahashi, Tokyo, Japan

[73] Assignee: Mitsubishi Denki Kabushiki Kaisha, Tokyo, Japan

[21] Appl. No.: 08/724,278

[22] Filed: Oct. 1, 1996

[30] Foreign Application Priority Data

Mar. 5, 1996 [JP] Japan ................................. 8-047368

[51] Int. Cl.⁶ .............................. G06F 19/00; G06G 7/70; G06G 7/76; G08G 1/00
[52] U.S. Cl. .................. 701/117; 701/117; 701/118; 701/119; 701/209; 340/988
[58] Field of Search .................... 701/117, 118, 701/119, 210, 201, 209; 340/705, 942, 995, 988, 934, 990; 180/178; 123/436

[56] References Cited

U.S. PATENT DOCUMENTS

| | | |
|---|---|---|
| 4,862,854 | 9/1989 | Oda et al. ................................. 123/399 |
| 5,247,439 | 9/1993 | Gurmu et al. ...................... 364/424.02 |
| 5,566,072 | 10/1996 | Momose et al. ......................... 364/436 |
| 5,732,383 | 3/1998 | Foladare et al. ......................... 701/117 |
| 5,745,865 | 4/1998 | Rostoker et al. ........................ 701/117 |

FOREIGN PATENT DOCUMENTS 63-172397  7/1988  Japan ............................... G08G 1/08

Primary Examiner—William A. Cuchlinski, Jr.
Assistant Examiner—Tim Wyckoff
Attorney, Agent, or Firm—Burns, Doane, Swecker & Mathis, L.L.P.

[57] ABSTRACT

When the vehicle is running in a low speed condition, a vehicle-mounted running control device performs vehicle control of a normal mode without performing of traffic jam control of the vehicle, if it is discriminated that the vehicle will change a running course thereof on the basis of road information of a scheduled vehicle running course obtained from a navigation system, and performs the traffic jam control with the vehicle being discriminated as in the traffic jam condition, if it is discriminated that the vehicle will not change the running course thereof.

19 Claims, 4 Drawing Sheets

RUNNING CONTROL DEVICE MOUNTED IN A VEHICLE

BACKGROUND OF THE INVENTION

1. Field of the Invention

The present invention relates to a running control device mounted in a vehicle for controlling a vehicle by using a navigation system, and more specifically relates to a running control device in which a required large driving force can be obtained without a performance for a traffic jam control such as reduction of an output of an engine of the vehicle when the vehicle changes the direction like turning right or left, or when the vehicle accelerates after passing through an intersection or a tollgate.

2. Description of the Prior Art

FIG. 4 illustrates a block diagram for showing a central control unit of a conventional vehicle, and FIG. 5 is a block diagram for showing a general navigation controlling unit.

In FIG. 4, a reference numeral 101 denotes a central control unit for controlling information of each control unit totally, such as an engine controlling unit 102 for controlling an engine of a vehicle, a transmission controlling unit 103 for controlling a transmission of the vehicle, and so on. In FIG. 5, a reference numeral 104 denotes a navigation system controlling unit for controlling navigation of the vehicle, and a reference numeral 105 shows a memory unit for storing map information. A reference numeral 106 denotes a course determining unit, having road information of an estimated running course, for processing information of a destination of the vehicle, a destination of the vehicle or the like so as to determining a scheduled running course of the vehicle, and a reference numeral 107 illustrates a position detecting unit for measuring a present position of the vehicle. A reference numeral 108 shows a display unit for displaying map information, a present position of the vehicle, and a scheduled course for the vehicle, and a reference numeral 109 denotes a voice message informing unit for informing a voice message of the present position of the vehicle or a running direction at an intersection of a road.

Generally, as shown in FIG. 4, a vehicle includes several sensors (not shown), and the engine controlling unit 102, the transmission controlling unit 103 and so on. The vehicle controls an engine, a transmission, a suspension, a steering device, an air conditioning system, a lighting device and so on for example based on results of processing information from the controlling units.

The controlling units are sometimes managed individually. However, the central controlling unit 101 generally manages the engine controlling unit 102, the transmission controlling unit 103 and so on totally while the central controlling unit 101 refers to and relates information of the controlling units.

In addition, recently, there has been developed an apparatus called a navigation system having a structure shown in FIG. 5 for detecting the present position by using signals from an artificial satellite or a sensor. In this conventional navigation system, a starting point, a destination of a vehicle and a plan of running course can be instructed on the basis of the processing results by the course determining unit 106, the position detecting unit and so on. The course determining unit 106 calculates a scheduled course by using a map information previously registered in the memory unit 105 in addition to the starting point, the destination of a vehicle and the plan of running course. The vehicle can be navigated by the information of the present position of the vehicle, a course direction at an intersection and the like displayed on the displaying unit 108, or outputted from the voice massage informing unit 109.

As a conventional example utilizing the above-mentioned vehicle sensors and controlling units, for instance, there is known as a traffic jam detecting apparatus described in JP-A 63/172397. In this conventional traffic jam detecting apparatus, an output value from a vehicle speed sensor is calculated, and the calculated result and a predetermined value which is previously determined are compared, then a traffic jam is determined when the calculated result indicates low speed running in the predetermined speed. A vehicle height adjusting device, suspensions, an automatic transmission device and an engine are controlled on the basis of the determination.

In addition, as another conventional traffic jam detecting apparatus for detecting a traffic jam by utilizing an output from a vehicle speed sensor, for instance, there are JP-A 59/200845, JP-A 59/200846, JP-A 59/200847.

Next, as a conventional example for controlling a vehicle on the basis of information from a navigation system, for instance, there is known as a hybrid-type vehicle described in JP-A 6/187595. In this conventional hybrid-type vehicle, accuracy of information for navigating the vehicle is improved by adding information of the road in which the vehicle running presently to map information of the navigation system, simultaneously a driving source (engine and motor, specifically) in accordance with a running position is switched so that the driving source adapts to a condition where various different peripheral environments at the same point exist such as a condition at a multilevel crossing or the like.

In the above-described conventional traffic jam detecting apparatus, if the speed of running vehicle becomes smaller than a standard value which is predetermined and into a slow speed condition, and the vehicle runs in the slow speed condition for a certain while, the apparatus determines a traffic jam condition. Thus, since the vehicle runs in the low speed lower than a predetermined speed when the vehicle changes the course such as turning right or left, or when the vehicle approaches near an intersection or a tollgate, the apparatus determines that the vehicle is in the traffic jam condition, whereby a traffic jam control is performed such that the output from the engine is reduced. As a result, there is a problem that a required driving force cannot be obtained, although a large driving force is required when the vehicle changes the course such that the vehicle turns right or left, or when the vehicle passes through an intersection or a tollgate.

Furthermore, in the above-described conventional navigation system, there is no means for canceling the traffic jam control when the vehicle changes the course direction such that the vehicle turns right or left while the vehicle runs in a traffic jam condition control or when the vehicle approaches near a tollgate while the vehicle runs in a traffic jam condition control. As a result, there is a problem that a required driving force is lacked, because the traffic jam control can not be canceled although the traffic jam control should be canceled in order to obtain a large driving force when the vehicle changes the course or when the vehicle passes through an intersection or a tollgate.

SUMMARY OF THE INVENTION

An object of the present invention is to provide a running control device mounted in a vehicle in which a required large driving force can be obtained, when the vehicle changes the course such that the vehicle turns right or left, or when the vehicle accelerates on passing through an intersection or a tollgate, by determining a non-jam condition so as not to perform the traffic jam control of the vehicle, even if the vehicle is running in a slow speed for a certain while.

In addition, another object of the present invention is to provide a running control device mounted in a vehicle in which a required large driving force can be obtained, when the vehicle changes the course such that the vehicle turns right or left, or when the vehicle accelerates on passing through an intersection or a tollgate, by canceling a traffic jam control even if the vehicle is running in a slow speed for a certain while.

According to the present invention, there can be provided a running control device mounted in a vehicle comprising: a navigation system controlling unit for controlling a memory unit for storing map information including position information of a vehicle, a position detecting unit for detecting a present position of the vehicle, a course determining unit having road information of a scheduled running course of the vehicle, for determining an scheduled running course of the vehicle, a display unit for displaying map information, a present position and an scheduled running course of the vehicle, a voice message informing unit for outputting a voice message; and position information calculating means for calculating position information of a present position of the vehicle by adding position information detected from the position detecting unit on map information read out from the memory unit; a central control unit for managing as a whole a plurality of control units provided to the vehicle, on the basis of information of a plurality of sensors provided to the vehicle; and a terminal device connected to the navigation system controlling unit and the central control unit, for transmitting information to at least one of the navigation system controlling unit and the central control unit, with information from both of the navigation system controlling unit and the central control unit being processed, wherein the terminal device includes: moving distance calculating means for calculating a moving distance of the vehicle in a certain time interval on the basis of position information at a present vehicle position transmitted from the navigation system controlling unit and position information at a present vehicle position after the certain time interval; low speed condition determining means for determining whether or not the calculated vehicle moving distance is a predetermined value or below, and whether or not the vehicle is in a low speed condition; running course determining means for determining whether or not the vehicle will change a running course in future on the basis of road information of a scheduled vehicle running course transmitted from the navigation system controlling unit, when the low speed condition determining means determines that the vehicle is in a low speed condition; and traffic jam determining means for determining that the vehicle is not in a traffic jam condition when the running course determining means determines that the vehicle will change a running course in future, and for determining that the vehicle is in a traffic jam condition when the running course determining means determines that the vehicle will not change a running course in future.

In accordance with a preferred embodiment of the present invention, the terminal device is constructed to include, instead of the running course determining means, intersection/tollgate determining means for determining whether or not a present position of the vehicle reached near one of an intersection and a tollgate on the basis of scheduled vehicle running course road information transmitted from the navigation system controlling unit when the low speed condition determining means determines that the vehicle is in a low speed condition, and the traffic jam determining means for determining that the vehicle is not in a traffic jam condition when the intersection/tollgate determining means determines that the vehicle present position reached near one of an intersection and a tollgate, and determines that the vehicle is in a traffic jam condition when the intersection/tollgate determining means determines that the vehicle present position does not reach near one of an intersection and a tollgate.

Further, in accordance with another preferred embodiment of the present invention, the terminal device includes running course determining means and intersection/tollgate determining means. The traffic jam determining means determines that the vehicle is not in a traffic jam condition when the running course determining means determines that the vehicle will not change a running course in future and when the intersection/tollgate determining means determines that the vehicle present position reached near the intersection or the tollgate, and determines that the vehicle is in a the traffic jam condition when the running course determining means determines that the vehicle will not change a running course in future and if the intersection/tollgate determining means determines that the vehicle present position does not reach near the intersection or the tollgate.

In accordance with further preferred embodiment of the present invention, the terminal device further includes traffic jam control information forming means for forming traffic jam control information for reducing an output from an engine to lessen fuel consumption, when the traffic jam determining means determines that the vehicle is in the traffic jam condition, and the central control unit instructs to an engine controlling unit, to perform a traffic jam control which is to reduce the output from the engine on the basis of traffic jam control information transmitted from the terminal device.

In accordance with further preferred embodiment of the present invention, the terminal device further includes engine output control information forming means for forming engine output control information for keeping a normal idle condition, when the traffic jam determining means determines that the vehicle is not in a traffic jam condition, and the central control unit instructs to an engine controlling unit, to keep the normal idle condition on the basis of engine output control information transmitted from the terminal device.

In accordance with further preferred embodiment of the present invention, the terminal device further includes traffic control cancel information forming means for forming traffic control cancel information for canceling a traffic control when the intersection/tollgate determining means determines that the vehicle present position reached near one of an intersection and a tollgate after the running course determining means determines that the vehicle will not change a running course in future, after the low speed condition determining means determines that a vehicle moving distance calculated by the moving distance calculating means is a predetermined value or below and the vehicle is in the low speed condition, when the engine controlling unit performs the traffic jam control so as to reduce the output from the engine on the basis of traffic jam controlling information transmitted from the terminal device, and the central control unit instructs to the engine controlling unit to cancel the traffic control on the basis of traffic control canceling information transmitted from the terminal device.

In accordance with further preferred embodiment of the present invention, the low speed condition determining means may determine whether or not a vehicle moving distance calculated by the moving distance calculating means assumes a predetermined value or above thereby the vehicle condition is changed from the low speed condition into a no-low speed condition, when the engine controlling unit performs the traffic jam control so as to reduce the output of the engine on the basis of traffic jam controlling information transmitted from the terminal device, and the terminal device may further include traffic control cancel information forming means for forming traffic control cancel information for canceling a traffic control when the low speed condition determining means determines that the vehicle is not in the low speed condition, and the central control unit may instruct to the engine controlling unit to cancel the traffic control on the basis of traffic control canceling information transmitted from the terminal device.

The terminal device further includes traffic control cancel information forming means for forming traffic control cancel information for canceling a traffic control when the running course determining means determines that the vehicle will change a running course in future, after the low speed condition determining means determines that a vehicle moving distance calculated by the moving distance calculating means is a predetermined value or below and the vehicle is in a low speed condition, when the engine controlling unit performs the traffic jam control so as to reduce the output from the engine on the basis of traffic jam controlling information transmitted from the terminal device, and the central control unit instructs to the engine controlling unit to cancel the traffic control on the basis of traffic control canceling information transmitted from the terminal device.

Further, in accordance with another preferred embodiment of the present invention, the terminal device further includes a driving power source selecting means for selecting one of an engine driving power source and a motor driving power source, on the basis of existence of a vehicle traffic jam condition determined by the traffic jam condition determining means, as a driving source of a hybrid type vehicle having the engine power source and the motor driving power source, and the central control unit instructs to a driving power source controlling unit provided as one control unit for the hybrid type vehicle so as to set a driving power source as the motor driving power source on the basis of driving power source information, transmitted from the terminal device, of the hybrid type vehicle, when the traffic jam determining means determines that the vehicle is in a traffic jam condition. Moreover, the central control unit instructs to a driving power source controlling unit provided as one control unit for the hybrid type vehicle so as to set a driving power source as the engine driving power source on the basis of driving power source information, transmitted from the terminal device, of the hybrid type vehicle, when the traffic jam determining means determines that the vehicle is not in a traffic jam condition.

Further objects and advantages of the present invention will be apparent from the following description of the preferred embodiments of the present invention as illustrated in the accompanying drawings.

DETAILED DESCRIPTION OF THE PREFERRED EMBODIMENTS

An embodiment of the present invention will be described with reference to figures hereinbelow.

Figure 1:
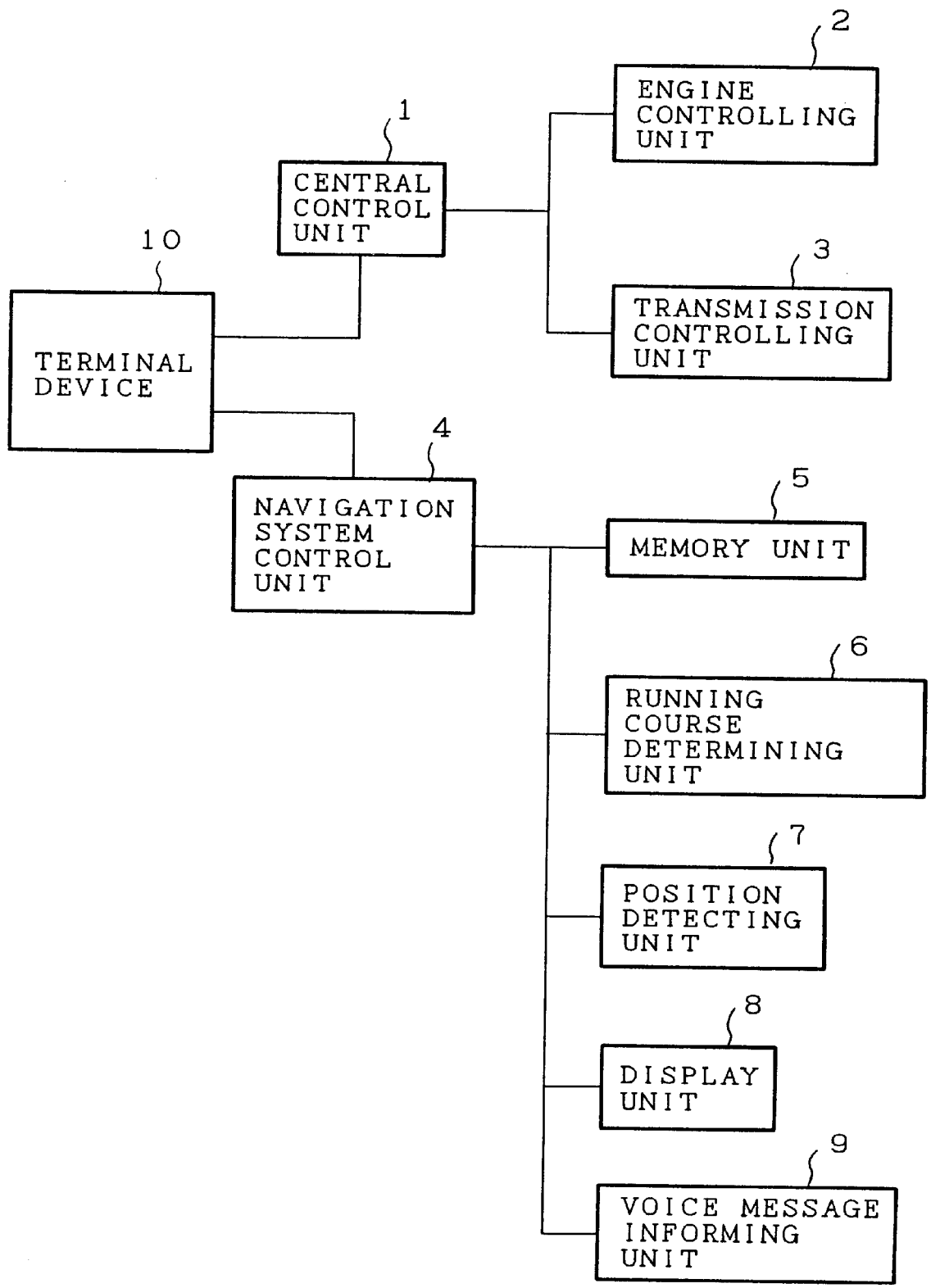
FIG. 1 is a block diagram for showing a structure of a running control device mounted in a vehicle according to an embodiment of the present invention.

FIG. 1 is a block diagram for showing a structure of a running control device mounted in a vehicle according to an embodiment of the present invention. In FIG. 1, a reference numeral 1 denotes a central control unit for totally controlling information of control units such as an engine controlling unit 2 for controlling an engine of a vehicle, a transmission controlling unit 3 for controlling a transmission of the vehicle, and so on. The engine controlling unit 2 and the transmission controlling unit 3 which are described here are representative examples of control units which are managed by the central control unit 1. A reference numeral 4 denotes a navigation system controlling unit for navigating the vehicle, and a reference numeral 5 denotes a memory unit for storing map information including a position information of the vehicle. A reference numeral 6 denotes a course determining unit having road information of a scheduled running course, for processing information including destination and indicated course so as to determine an future running course of the vehicle, and a reference numeral 7 denotes a position detecting unit for measuring a present position of the vehicle based on information from an artificial satellite or a sensor.

A reference numeral 8 denotes a display unit for displaying map information, a present position of the vehicle, a scheduled course of the vehicle, traffic jam information and so on to inform them to a driver, a reference numeral 9 denotes a voice message informing unit for informing a voice message to the driver, and a reference numeral 10 denotes a terminal device which is connected to the central control unit 1 and the navigation system controlling unit 4 of the vehicle, for calculating by using information from the central control unit 1 and the navigation system, and properly transmitting information to the central control unit 1 and the navigation system controlling unit 4.

The terminal device 10 collects the information from the central control unit 1 and the navigation system controlling unit 4 to calculate, and properly transmits the result of the calculation to the central control unit 1 and the navigation system controlling unit 4. At this time, the central control unit 1 performs information exchange with the terminal device 10, while the central control unit 1 totally manages the controlling unit such as the engine controlling unit 2, the transmission controlling unit 3, and so on. The navigation system controlling unit 4 also performs information exchange with the terminal device 10. The navigation system 4 instructs to each unit of the navigation system to measure the present vehicle position, to match between the present vehicle position information which is measured and map information, to determine the optimum course,. and so on.

First of all, the terminal device 10 demands position information of a present vehicle position to the navigation system controlling unit 4 by every certain time. The navigation system controlling unit 4 transmits information of the present vehicle position which is calculated previously on the basis both of map information stored in the memory unit 5 and present vehicle position information which is detected at the position detecting unit 7 to the terminal, device 10 by every certain time. The position information from the navigation system controlling unit 4 includes information detected by the position detecting unit 7 and map information read out from the memory unit 5. Here, this position information is stored at the memory unit 5 after calculation, and is read out from the memory unit 5 and transmitted to the terminal device 10. The vehicle position information detected at the position detecting unit 7 is obtained from the artificial satellite or the sensor. In the memory unit 5, the map information and information of latitude, longitude, height above sea level, and attribute are stored as position information. In the memory unit 5, information of latitude, longitude, height above sea level, and attribute are stored with corresponding map information. For example, the information is stored such that longitude is 139 degrees 45 minutes east, latitude is 35 degrees 40 minutes north, height above sea level is 10 m, and attribute is a general road. there are a general road, a general road and intersection, an express highway, an express highway and tollgate, and so on as attributes.

Next, when the terminal device 10 obtains the position information of the present vehicle position from the navigation system controlling unit 4 by every certain time in a step S1, the moving distance of the vehicle in the certain time is calculated based on the position information of the present vehicle position at a time t1 and the position information of the present vehicle position at a time t2 after the certain time in a step S2. The terminal device 10 determines whether or not the vehicle is in a low speed condition, by judging whether or not the calculated vehicle moving distance is the predetermined value or below in a step S3. Here, if the vehicle speed is determined as in the low speed condition, road information of a scheduled vehicle running course transmitted from the navigation system controlling unit 4 is obtained at a step S4. In the step S3, if the vehicle speed is determined as in no-low speed condition because the vehicle moving distance calculated at the terminal device 10 is lager than the predetermined values the terminal device 10 instructs the central control unit 1 to control with a normal mode. Then the flow returns to the step S1.

The terminal device 10 determines whether or not the vehicle changes the course direction in future on the basis of the road information on the scheduled vehicle running course which is obtained from the navigation system controlling unit 4 in a step S5. If the terminal device 10 determines that the vehicle changes the course direction in future, the terminal device 10 decides that a traffic jam does not occur even when the vehicle runs in a low speed, generates information for controlling an engine output for keeping an idle condition in the normal mode and transmits the information to the central control unit 1. The central control unit 1 instructs the engine controlling unit 2 so as to keep the idle condition of the normal mode on the basis of the information for controlling the engine output which is transmitted from the terminal device 10. Then the flow returns to the step S1.

When the terminal device 10 determines that the vehicle will not change the course direction in future at the step S5, the terminal device 10 inputs road information regarding the scheduled running course of the vehicle which is transmitted from the navigation system controlling unit 4 at a step S6. Next, the terminal device 10 determines whether or not the present position of the vehicle reaches near an intersection or a tollgate on the basis of the information of the scheduled running course inputted from the navigation system controlling unit 4 at a step S7. If the terminal device 10 determines that the present vehicle position reached near the intersection or the tollgate, the terminal device 10 decides that a traffic jam does not occur even when the vehicle runs in a low speed, generates information for controlling an engine output for keeping an idle condition in the normal mode and transmits the information to the central control unit 1. The central control unit 1 instructs the engine controlling unit 2 so as to keep the idle condition of the normal mode on the basis of the information for controlling the engine output which is transmitted from the terminal device 10. Then the flow returns to the step Si.

The terminal device 10 decides that the vehicle is in a traffic jam condition, if the terminal device 10 determined that the present vehicle position did not reach near the intersection or the tollgate on the basis of the road information of the scheduled running course at the step S7. If the terminal device 10 decides that the vehicle is in a traffic jam condition, the terminal device 10 generates the information for controlling the traffic jam condition to reduce the output from the engine, and transmits the information to the central control unit 1 at a step S8. Then the central control unit 1 instructs to reduce the output of the engine to the engine controlling unit 2 on the basis of the traffic jam controlling information which is transmitted form the terminal device 10. The engine controlling unit 2 performs the traffic jam condition control so as to reduce the output of the engine. Then the flow returns to the step S1.

When the engine controlling unit 2 performs the traffic jam control so as to reduce the output from the engine on the basis of the traffic jam controlling information transmitted from the terminal device 10, if the terminal device 10 detects that a calculated moving distance of the vehicle becomes larger than the predetermined value, and the vehicle speed changes the low speed into no-low speed (the steps S1 to S3), the terminal device 10 generates traffic jam control canceling information for canceling the traffic jam control and transmits the information to the central control unit 1. The central control unit 1 instructs to the engine controlling unit 2 to cancel the traffic jam control on the basis of the traffic jam controlling information transmitted from the terminal device 10. Then the flow returns to the step S1.

When the engine controlling unit 2 performs the traffic jam control so as to reduce the output from the engine on the basis of the traffic jam controlling information transmitted from the terminal device 10, the terminal device 10 determines that the vehicle changes the course direction in future on the basis of road information of the scheduled running course obtained from the navigation system controlling unit 4 (the steps S4 and S5) after the terminal device 10 determines that a calculated moving distance of the vehicle is the predetermined value or below, and the vehicle is in a low speed condition (the steps S1 to S3), the terminal device 10 generates traffic jam control canceling information for canceling the traffic jam control. The central control unit 1 instructs to the engine controlling unit 2 to cancel the traffic jam control on the basis of the traffic jam controlling information transmitted from the terminal device 10. Then the flow returns to the step Si.

When the engine controlling unit 2 performs the traffic jam control so as to reduce the output from the engine on the basis of the traffic jam controlling information which is transmitted from the terminal device 10, a calculated moving distance of the vehicle is the predetermined value or below, and if the vehicle is determined as in a low speed condition (the steps S1 to S3), then, after the determining that the vehicle will not change the course direction in future on the basis of road information of the scheduled vehicle running course which is obtained from the central control unit 1 (the step 5), it is determined that the present vehicle position reached near the intersection or the tollgate (the step S7), the terminal device 10 forms traffic jam control canceling information for canceling the traffic jam control. The central control unit 1 instructs to the engine controlling unit 2 to cancel the traffic jam control on the basis of the traffic jam controlling information which is transmitted from the terminal device 10. Then the flow returns to the step S1.

Since the present embodiment has a structure that, after the vehicle is in the low speed condition, when the vehicle changes the course direction such as turning right or left, or when the vehicle reaches near the intersection or tollgate, it is determined that the vehicle is not in traffic jam condition to control the vehicle with the normal mode, the traffic jam control is not performed when the vehicle changes the course direction such as turning right or left and when the vehicle passes through the intersection or the tollgate, whereby a required large driving force can be obtained easily in such case.

Since the running control device according to the present embodiment stops traffic jam control in case the condition of the vehicle speed is changed to fast condition, i.e. no-low speed condition from the low speed condition, the vehicle will change the course direction such that it turns right or left in future, or the vehicle reaches the intersection or the tollgate even when the running control device carries out traffic jam control, the traffic jam condition can be efficiently canceled. In addition, when the vehicle changes the course direction such that it turns right or left, or when the vehicle accelerates on passing through the intersection or the tollgate, the vehicle can be controlled with the normal mode, whereby the vehicle can run with an enough driving force without lack of the driving force.

It is described in the present embodiment that the running control device carries out the traffic jam control of the vehicle after the running control device decides on the basis of the road information of the scheduled running course the vehicle reaches near the intersection or the tollgate, and the running control device does not carry out the traffic jam control of the vehicle immediately when the running control device determines on the basis of the road information of the scheduled running course that the vehicle will not change the course direction in future.

However, the present invention is not limited to only such an embodiment. For example, the running control device can determine that the vehicle in a traffic jam and carry out the traffic jam control of the vehicle immediately when the running control device determines on the basis of the road information of the scheduled running course that the vehicle will not change the course direction in future. In this case, if the running control device does not determine that the traffic jam occurs merely because the vehicle becomes to be in a low speed condition, and determines that the traffic jam occurs because the vehicle changes the running direction even when the vehicle is in a low speed condition, a required large driving force can be obtained when the vehicle changes the running direction in a low speed condition.

It is described in the present embodiment that the running control device carries out the traffic jam control of the vehicle after judging the vehicle will not change the running course on the basis of the road information of the scheduled running course before the running control device determines whether the vehicle reaches near the intersection or the tollgate or not on the basis of the road information of the scheduled running course.

However, the present invention is not limited to only such an embodiment. For example, the running control device can decide that the vehicle is in a traffic jam and carry out the traffic jam control of the vehicle immediately when the running control device determines on the basis of the road information of the scheduled running course that the vehicle does not reach near the intersection or the tollgate after the running control device determines that the vehicle is in a low speed condition while the running control device does not determine whether the vehicle will change the running course. In this case, if the running control device does not determine that the traffic jam occurs merely because the vehicle becomes to be in a low speed condition, and determines that the traffic jam occurs because the vehicle reaches near the intersection or the tollgate even when the vehicle is in a low speed condition, a required large driving force can be obtained when the vehicle accelerates after passing through the intersection or the tollgate.

Figure 3:
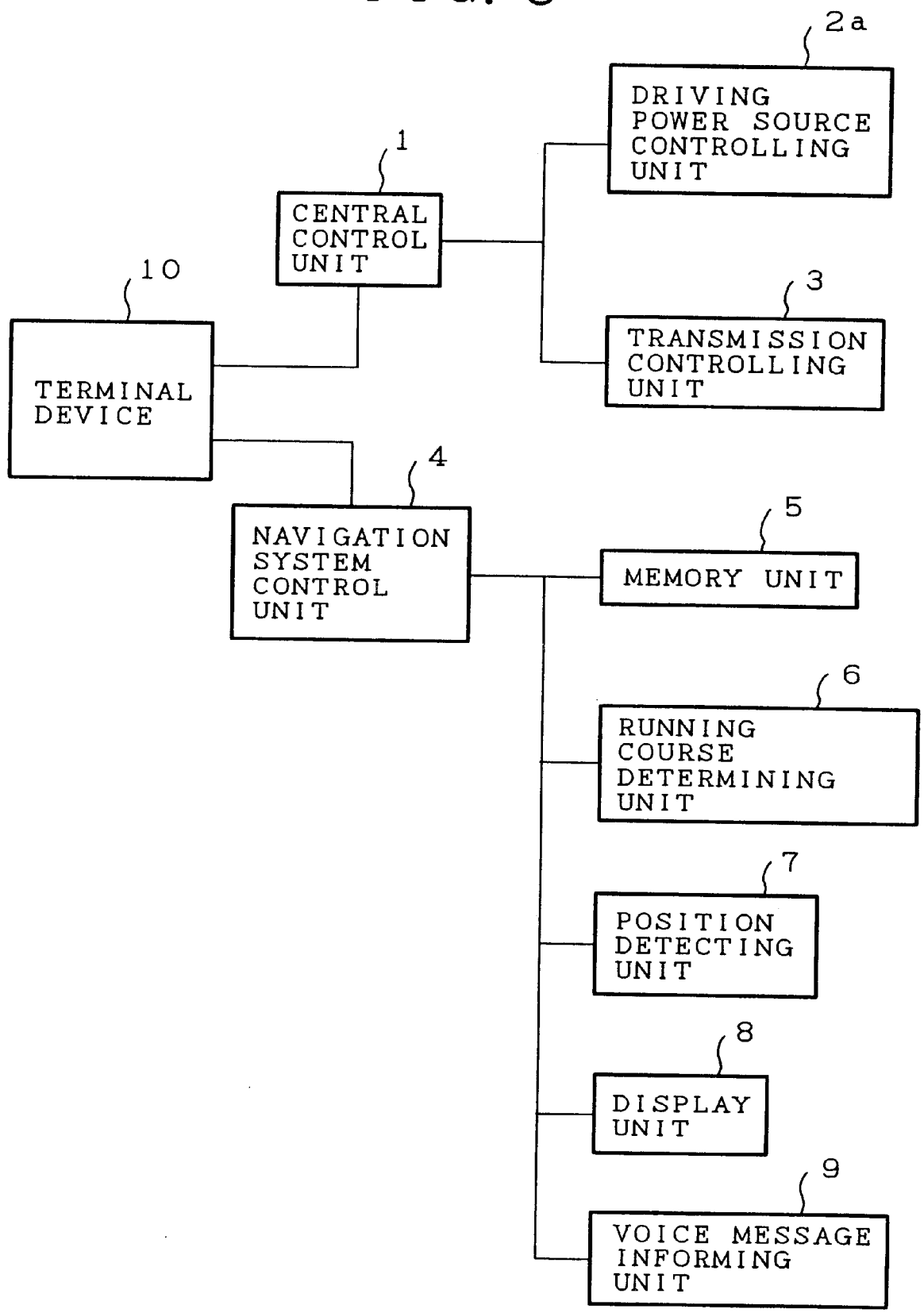
FIG. 3 is a block diagram for showing a structure of a running control device mounted in a vehicle according to another embodiment of the present invention.
Figure 4:
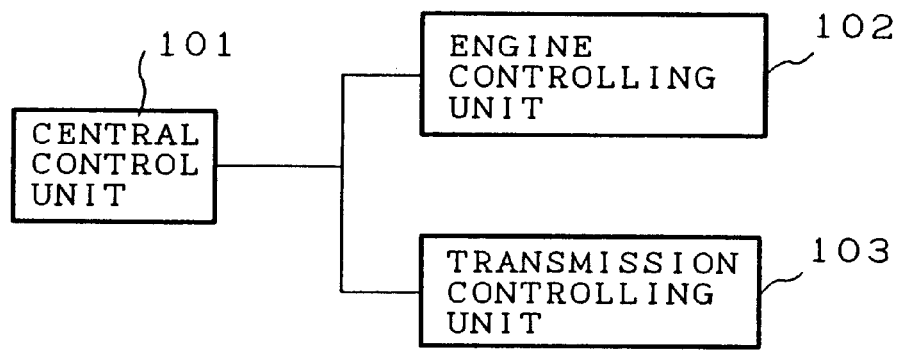
FIG. 4 is a block diagram for showing a central control unit of a conventional vehicle.
Figure 5:
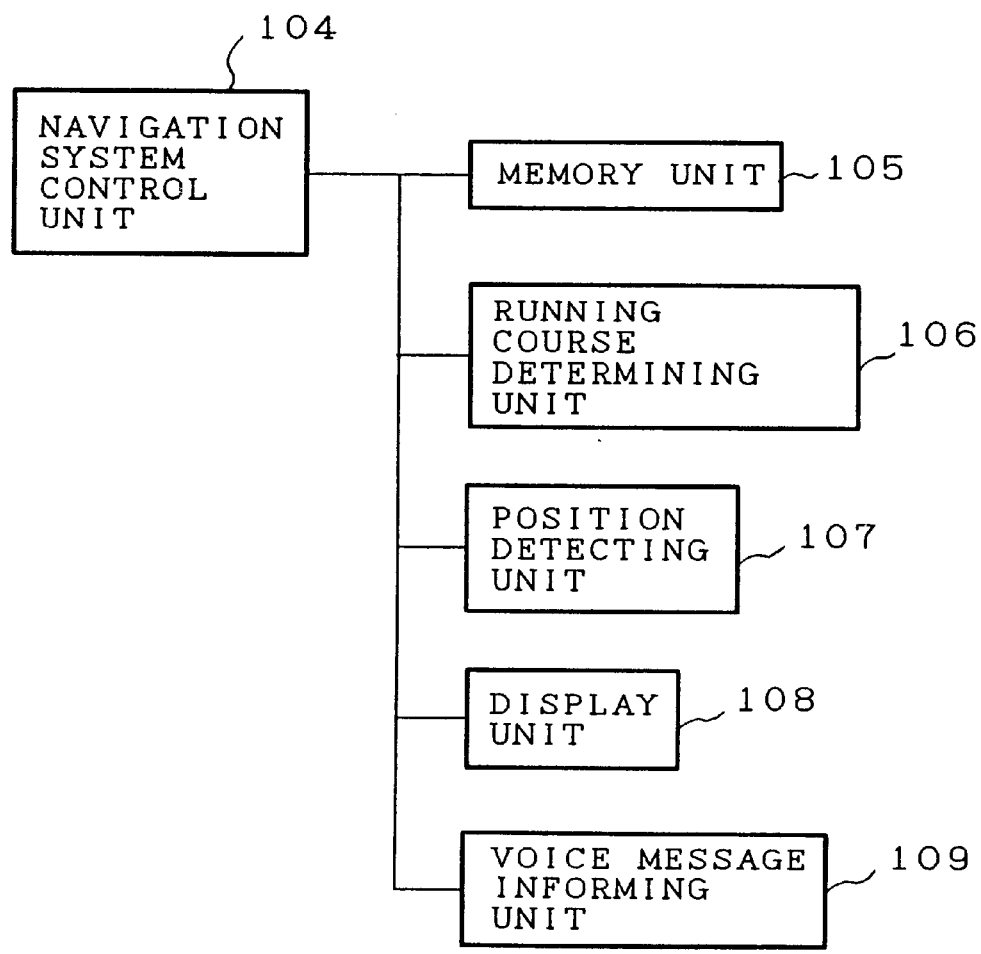
FIG. 5 is a block diagram for showing a navigation controlling unit.

FIG. 3 is a block diagram for showing a structure of a running control device mounted in a vehicle according to another embodiment of the present invention. In FIG. 3, the same reference numerals which are illustrated in FIG. 1 show the same structural elements as of the above-described embodiment, and a reference numeral 2a denotes a driving power source controlling unit.

Although in the above-mentioned embodiment it is described that a switching control between the traffic jam control mode and the normal mode is performed by the engine controlling unit 2, the present invention is not limited to only the embodiment. The present invention can be applied to a control of the driving power source controlling unit 2a which is to be mounted on a hybrid type vehicle having an engine driving power source and a motor driving power source.

Figure 2:
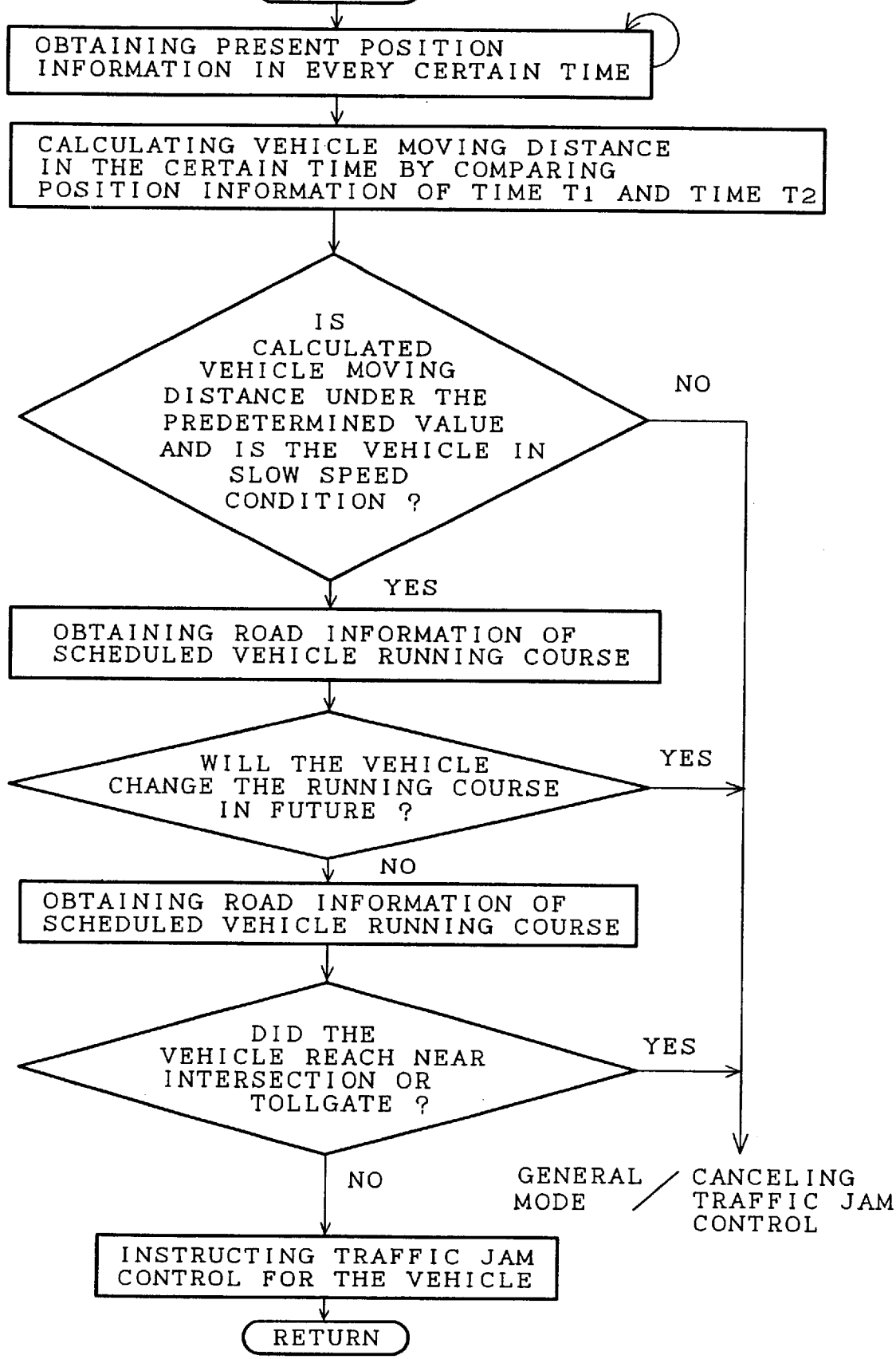
FIG. 2 is a flowchart for showing a processing flow of a terminal device of the running control device which is shown in FIG. 1.

The terminal device 10 has a function for selecting one of the engine driving power source or the motor driving power source, as a driving power source for the hybrid type vehicle on the basis of existence of the vehicle traffic jam condition which is determined by using the same way as of the above-mentioned embodiment shown in FIG. 2. The central control unit 1 instructs, as shown in FIG. 3, to the driving power controlling unit 2a of the hybrid type vehicle so as to set the driving power source as the motor driving power source on the basis of driving power source information, transmitted from the terminal device 10, of the hybrid type vehicle, in case that the terminal device 10 determines that the vehicle is in the traffic jam condition. In this case, the traffic jam control can be efficiently performed because the traffic jam control is carried out by the motor driving power source.

In addition, the central control unit 1 instructs to the driving power source controlling unit 2a of the hybrid type vehicle so as to set the driving power source as the engine driving power source on the basis of driving power source information, transmitted from the terminal device 10, of the hybrid type vehicle, in case that the terminal device 10 determines that the vehicle is not in the traffic jam condition. In this case, efficient running can be performed if the engine driving power source when controlling with the normal mode without the traffic jam control performance is selected.

What is claimed is:

1. A control device mounted in a vehicle comprising:

a navigation system controlling unit for controlling a memory unit for storing map information including position information of a vehicle, a position detecting unit for detecting a present position of the vehicle, a course determining unit having road information of a scheduled running course of the vehicle for determining an estimated running course of the vehicle wherein the road information includes location of known impediments on the road, a display unit for displaying map information, a present position and a scheduled running course of the vehicle, and a voice message informing unit for outputting a voice message;

wherein the navigation system controlling unit includes position information calculating means for calculating and outputting position information of a present position of the vehicle on the basis both of position information detected from said position detecting unit and map information read out from said memory unit;

a central control unit for totally managing a plurality of control units provided to the vehicle, on the basis of information of a plurality of sensors mounted in the vehicle; and a terminal device connected to said navigation system controlling unit and said central control unit, for processing information from both of said navigation system controlling unit and said central control unit, and transmitting information to at least one of said navigation system controlling unit and said central control unit;

wherein said terminal device includes:

moving distance calculating means for calculating a moving distance of the vehicle in a certain time interval on the basis of position information at a present vehicle position transmitted from said navigation system controlling unit and position information at a present vehicle position after said certain time interval;

low speed condition determining means for deciding whether or not the vehicle is in a low speed condition by determining whether or not calculated vehicle moving distance is a predetermined value or below;

running course determining means for determining on the basis of road information of a scheduled vehicle running course transmitted from said navigation system controlling unit whether or not the vehicle will change a running course in future, when said low speed condition determining means determines that the vehicle is in a low speed condition; and traffic jam determining means for determining that the vehicle is not in a traffic jam condition when said running course determining means determines that the vehicle will change a running course in future, and determining that the vehicle is in a traffic jam condition when said running course determining means determines that the vehicle will not change a running course in future.

2. A running control device mounted in a vehicle according to claim 1, wherein said terminal device further includes traffic jam control information forming means for forming traffic jam control information for reducing an output from an engine to lessen fuel consumption, in case said traffic jam determining means determines that the vehicle is in a traffic jam condition, and wherein said central control unit instructs to an engine controlling unit provided as one of said plural control units, to perform a traffic jam control which is to reduce output of said engine on the basis of traffic jam control information transmitted from said terminal device.

3. A running control device mounted in a vehicle according to claim 1, wherein said terminal device further includes engine output control information forming means for forming engine output control information for keeping a normal idle condition, in case said traffic jam determining means determines that the vehicle is not in a traffic jam condition, and wherein said central control unit instructs to an engine controlling unit provided as one of said plural control units, to keep said normal idle condition on the basis of engine output control information transmitted from said terminal device.

4. A running control device mounted in a vehicle according to claim 1, wherein said terminal device further includes intersection/tollgate determining means for determining whether or not a present position of the vehicle reached near one of an intersection and a tollgate on the basis of scheduled vehicle running course road information transmitted from said navigation system controlling unit after said running course determining means determines that the vehicle will not change a running course in future, and wherein said traffic jam determining means determines that the vehicle is not in a traffic jam condition in case said running course determining means determines that the vehicle will not change a running course and said intersection/tollgate determining means determines that the vehicle present position reached near one of an intersection and a tollgate, and determines that the vehicle is in a traffic jam condition in case said intersection/tollgate determining means determines that the vehicle present position does not reach near one of an intersection and a tollgate and the vehicle will not change a running course in future.

5. A running control device mounted in a vehicle according to claim 4, wherein said terminal device further includes traffic control cancel information forming means for forming traffic control cancel information for canceling a traffic control in case said intersection/tollgate determining means determines that the vehicle present position reached near one of an intersection and a tollgate after said running course determining means determines that the vehicle will not change a running course in future, after said low speed condition determining means determines that a vehicle moving distance calculated by said moving distance calculating means is a predetermined value or below and the vehicle is in said low speed condition, when said engine controlling unit provided as one of said plural control units performs said traffic jam control so as to reduce the output of said engine on the basis of traffic jam controlling information transmitted from said terminal device, and wherein said central control unit instructs to said engine controlling unit to cancel said traffic control on the basis of traffic control canceling information transmitted from said terminal device.

6. A running control device mounted in a vehicle according to claim 1, wherein said low speed condition determining means determines whether or not a vehicle moving distance calculated by said moving distance calculating means assumes a predetermined value or above thereby the vehicle condition is changed or not from said low speed condition into a no-low speed condition, when said engine controlling unit provided as one of said plural control units performs said traffic jam control so as to reduce said output from said engine on the basis of traffic jam controlling information transmitted from said terminal device, wherein said terminal device further includes traffic control cancel information forming means for forming traffic control cancel information for canceling a traffic control when said low speed condition determining means determines that the vehicle is not in said low speed condition, and wherein said central control unit instructs to said engine controlling unit to cancel said traffic control on the basis of traffic control canceling information transmitted from said terminal device.

7. A running control device mounted in a vehicle according to claim 1, wherein said terminal device further includes traffic control cancel information forming means for forming traffic control cancel information for canceling a traffic control in case said running course determining means determines that the vehicle will change a running course in future, after said low speed condition determining means determines that a vehicle moving distance calculated by said moving distance calculating means is a predetermined value or below and the vehicle is in a low speed condition, when said engine controlling unit provided as one of said plural control units performs said traffic jam control so as to reduce the output of said engine on the basis of traffic jam controlling information transmitted from said terminal device, and wherein said central control unit instructs to said engine controlling unit to cancel said traffic control on the basis of traffic control canceling information transmitted from said terminal device.

8. A running control device mounted in a vehicle according to claim 1, wherein said terminal device further includes a driving power source selecting means for selecting one of an engine driving power source and a motor driving power source, on the basis of existence of a vehicle traffic jam condition determined by said traffic jam condition determining means, as a driving source of a hybrid type vehicle having said engine power source and said motor driving power source, and wherein said central control unit instructs to a driving power source controlling unit provided as one control unit for said hybrid type vehicle so as to set a driving power source as said motor driving power source on the basis of driving power source information, transmitted from said terminal device, of said hybrid type vehicle, when said traffic jam determining means determines that the vehicle is in a traffic jam condition.

9. A running control device mounted in a vehicle according to claim 1, wherein said terminal device further includes a driving power source selecting means for selecting one of an engine driving power source and a motor driving power source, on the basis of existence of a vehicle traffic jam condition determined by said traffic jam condition determining means, as a driving source of a hybrid type vehicle having said engine power source and said motor driving power source, and wherein said central control unit instructs to a driving power source controlling unit provided as one control unit for said hybrid type vehicle so as to set a driving power source as said engine driving power source on the basis of driving power source information, transmitted from said terminal device, of said hybrid type vehicle, when said traffic jam determining means determines that the vehicle is not in a traffic jam condition.

10. A running control device mounted in a vehicle comprising:

a navigation system controlling unit for controlling
a memory unit for storing map information including position information of a vehicle,
a position detecting unit for detecting a present position of the vehicle,
a course determining unit having road information of a scheduled running course of the vehicle for determining an estimated running course of the vehicle wherein the road information includes location of known obstacles on the road,
a display unit for displaying map information, a present position and a scheduled running course of the vehicle, and
a voice message informing unit for outputting a voice message;
wherein the navigation system controlling unit includes position information calculating means for calculating and outputting position information of a present position of the vehicle on the basis both of position information detected from said position detecting unit and map information read out from said memory unit;

a central control unit for totally managing a plurality of control units provided to the vehicle, on the basis of information of a plurality of sensors mounted in the vehicle; and a terminal device connected to said navigation system controlling unit and said central control unit, for processing information from both of said navigation system controlling unit and said central control unit, and transmitting information to at least one of said navigation system controlling unit and said central control unit;

wherein said terminal device includes:
moving distance calculating means for calculating a moving distance of the vehicle in a certain time interval on the basis of position information at a present vehicle position transmitted from said navigation system controlling unit and position information at a present vehicle position after said certain time interval;
low speed condition determining means for deciding whether or not the vehicle is in a low speed condition by determining whether or not calculated vehicle moving distance is a predetermined value or below;
intersection/tollgate determining means for determining that a present vehicle position reached near one of an intersection and a tollgate on the basis of road information of a scheduled vehicle running course transmitted from said navigation system controlling unit, when said low speed condition determining means determines that the vehicle is in a low speed condition; and
traffic jam condition determining means for determining that the vehicle is not in a traffic jam condition when said intersection/tollgate determining means determines that a vehicle present position reached near one of said intersection and said tollgate, and for determining that the vehicle is in a traffic jam condition when said intersection/tollgate determining means determines that a vehicle present position does not reach near one of said intersection and said tollgate.

11. A running control device mounted in a vehicle according to claim 10, wherein said terminal device further includes traffic jam control information forming means for forming traffic jam control information for reducing an output from an engine to lessen fuel consumption, in case said traffic jam determining means determines that the vehicle is in a traffic jam condition, and wherein said central control unit instructs to an engine controlling unit provided as one of said plural control units, to perform a traffic jam control which is to reduce output of said engine on the basis of traffic jam control information transmitted from said terminal device.

12. A running control device mounted in a vehicle according to claim 10, wherein said terminal device further includes engine output control information forming means for forming engine output control information for keeping a normal idle condition, in case said traffic jam determining means determines that the vehicle is not in a traffic jam condition, and wherein said central control unit instructs to an engine controlling unit provided as one of said plural control units, to keep said normal idle condition on the basis of engine output control information transmitted from said terminal device.

13. A running control device mounted in a vehicle according to claim 10, wherein said low speed condition determining means determines whether or not a vehicle moving distance calculated by said moving distance calculating means assumes a predetermined value or above thereby the vehicle condition is changed from said low speed condition into a no-low speed condition, when said engine controlling unit provided as one of said plural control units performs said traffic jam control so as to reduce said output from said engine on the basis of traffic jam controlling information transmitted from said terminal device, wherein said terminal device further includes traffic control cancel information forming means for forming traffic control cancel information for canceling a traffic control when said low speed condition determining means determines that the vehicle is not in a low speed condition, and wherein said central control unit instructs to said engine controlling unit to cancel said traffic control on the basis of traffic control canceling information transmitted from said terminal device.

14. A running control device mounted in a vehicle according to claim 10, wherein said terminal device further includes running course determining means for determining whether or not the vehicle will change a running course in future on the basis of road information of a scheduled vehicle running course transmitted from said navigation system control unit when said low speed condition determining means determines that the vehicle is in a low speed condition, and wherein said traffic jam determining means determines that the vehicle is not in a traffic jam condition when said running course determining means determines that the vehicle will not change a running course in future and said intersection/tollgate determining means determines that the vehicle reaches near one of said intersection and said tollgate, and determines that the vehicle is in a traffic jam condition when said running course determining means determines that the vehicle will not change a running course in future and said intersection/tollgate determining means determines that the vehicle does not reach near one of said intersection and said tollgate.

15. A running control device mounted in a vehicle according to claim 14, wherein said terminal device further includes traffic control cancel information forming means for forming traffic control cancel information for canceling a traffic control when said running course determining means determines that the vehicle will change a running course in future, after said low speed condition determining means determines that a vehicle moving distance calculated by said moving distance calculating means is a predetermined value or below and the vehicle is in a low speed condition, when said engine controlling unit provided as one of said plural control units performs said traffic jam control so as to reduce said output from said engine on the basis of traffic jam controlling information transmitted from said terminal device, and wherein said central control unit instructs to said engine controlling unit to cancel said traffic control on the basis of traffic control canceling information transmitted from said terminal device.

16. A running control device mounted in a vehicle according to claim 10, wherein said terminal device further includes a driving power source selecting means for selecting one of an engine driving power source and a motor driving power source, on the basis of existence of a vehicle traffic jam condition determined by said traffic jam condition determining means, as a driving source of a hybrid type vehicle having said engine power source and said motor driving power source, and wherein said central control unit instructs to a driving power source controlling unit provided as one control unit for said hybrid type vehicle so as to set a driving power source as said motor driving power source on the basis of driving power source information, transmitted from said terminal device, of said hybrid type vehicle, when said traffic jam determining means determines that the vehicle is in a traffic jam condition.

17. A running control device mounted in a vehicle according to claim 10, wherein said terminal device further includes a driving power source selecting means for selecting one of an engine driving power source and a motor driving power source, on the basis of existence of a vehicle traffic jam condition determined by said traffic jam condition determining means, as a driving source of a hybrid type vehicle having said engine power source and said motor driving power source, and wherein said central control unit instructs to a driving power source controlling unit provided as one control unit for said hybrid type vehicle so as to set a driving power source as said engine driving power source on the basis of driving power source information, transmitted from said terminal device, of said hybrid type vehicle, when said traffic jam determining means determines that the vehicle is not in a traffic jam condition.

18. The control device of claim 1 wherein said known impediments on the road comprises at least one of an intersection and a tollbooth.

19. The control device of claim 10 wherein said known obstacles on the road comprises at least one of an intersection and a tollbooth.

* * * * *